(12) United States Patent
Kliesch et al.

(10) Patent No.: US 8,668,970 B2
(45) Date of Patent: Mar. 11, 2014

(54) USE OF AN ANTIMONY-FREE POLYESTER FILM FOR PRODUCING FILM BAGS AND FILM TUBES WITH HIGH HEAT RESISTANCE

(71) Applicant: Mitsubishi Polyester Film GmbH, Wiesbaden (DE)

(72) Inventors: Holger Kliesch, Ginsheim-Gustavsburg (DE); Cynthia Bennett, Alzey (DE); Bodo Kuhmann, Runkel (DE); Matthias Konrad, Kriftel (DE); Thomas Hackl, Huenstetten (DE); Stefanie Bauer, Bischofsheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 13/687,094

(22) Filed: Nov. 28, 2012

(65) Prior Publication Data

US 2013/0142973 A1  Jun. 6, 2013

(30) Foreign Application Priority Data

Dec. 5, 2011 (DE) .......................... 10 2011 087 740

(51) Int. Cl.
*B29D 22/00* (2006.01)

(52) U.S. Cl.
USPC ........................... 428/35.3; 428/480; 525/444

(58) Field of Classification Search
USPC ................................ 428/35.3, 480; 525/444
See application file for complete search history.

(56) References Cited

U.S. PATENT DOCUMENTS

| 4,031,165 | A * | 6/1977 | Saiki et al. ..................... 525/444 |
| 6,129,961 | A * | 10/2000 | Sonoda et al. ............... 428/35.7 |
| 7,964,265 | B2 * | 6/2011 | Matsui et al. ................. 428/141 |
| 2013/0142973 | A1 * | 6/2013 | Kliesch et al. ............... 428/35.3 |

FOREIGN PATENT DOCUMENTS

| EP | 2 164 079 A1 | 3/2010 |
| JP | 2007077220 A1 | 3/2007 |

OTHER PUBLICATIONS

Haldimann, M. et al., *Food Additives and Contaminants*, 2007; 24(8): pp. 860-868.
Shotyk, W. et al., *Environ. Sci. Technol.*, 2007, 41 (5), pp. 1560 -1563.

* cited by examiner

*Primary Examiner* — N. Edwards
(74) *Attorney, Agent, or Firm* — ProPat, L.L.C.

(57) ABSTRACT

Film bags or film tubes formed from biaxially oriented film including less than 10 ppm of antimony and having a haze of less than 10% are provided. The films have an ultimate tensile strength of more than 100 N/mm$^2$; have a difference in the ultimate tensile strength in MD and TD of less than 180 N/mm$^2$; have a tensile strain at break of more than 50%; a tensile strain at break of more than 260%; have a yellowness index b* of less than 2.5; have a lightness L*>85; include from 50 to 15 000 ppm of free-radical scavenger; have an SV of at least 600 after ovening; have a tensile strain at break of >5% after ovening; have a film thickness of from 6 to 26 μm; and include more than 90% by weight of polyester.

3 Claims, No Drawings

USE OF AN ANTIMONY-FREE POLYESTER FILM FOR PRODUCING FILM BAGS AND FILM TUBES WITH HIGH HEAT RESISTANCE

CROSS-REFERENCE TO RELATED APPLICATIONS

This application claims priority to German Patent Application 10 2011 087 740.1 filed Dec. 5, 2011 which is hereby incorporated herein by reference in its entirety.

FIELD OF THE INVENTION

The invention relates to the use of antimony-free polyester films for producing film bags or film tubes with high heat resistance, enabling them to remain for more than one hour in an oven at temperatures of 220° C. without embrittlement.

BACKGROUND OF THE INVENTION

Transparent, oriented polyester films have been known for a long time. Films produced from an antimony-free polyester are likewise known. Roasting bags and sleeves made of polyester film are likewise known.

Film bags for the baking of bread, and in particular film bags and tubes intended for cooking an entire dish in the oven, have to withstand temperatures above 200° C. for more than one hour without mechanical failure (e.g. due to bursting as a consequence of embrittlement). Industrial practice is to use almost exclusively film bags and tubes made of polyethylene terephthalate (PET), because this material has high heat resistance.

The traditional catalysts for producing polyesters continue to be antimony compounds. Some antimony compounds can be hazardous to health in particular at relatively high concentrations and if exposure is frequent. The EU therefore prescribes a maximum permissible migration of antimony from a film into a food. The high usage temperatures in oven applications increase antimony migration and for this reason alone it is desirable to reduce antimony content. Studies by the Swiss Department of Health show that, in actual foods, the migration limit for antimony is exceeded, sometimes considerably, at oven temperatures as low as 180° C. (see M. Haldimann, A. Blanc and V. Dudler, in Food Additives and Contaminants, 2007; 24(8): 860-868). Indeed, there are discussions in the technical literature where much smaller traces of antimony from PET are considered to be potentially hazardous (e.g. W. Shotyk and M. Krachler in Environ. Sci. Technol., 2007, (5), pp. 1560-1563). For an application in direct contact with food at greatly elevated temperatures it would therefore be important to use an antimony-free film.

However, an analysis carried out for the purposes of this invention, taking more than 10 different roasting film bags and sleeves from various producers revealed the presence of antimony in all of the instances studied, albeit with values reduced (from 50 to 110 ppm) in comparison with standard antimony-containing films (standard film mostly >150 ppm). Antimony is easily detected at above 10 ppm by commonly used methods of digestion and analysis, and migration of antimony out of a film is similarly detectable by selecting suitable conditions (high temperature >100° C. in foods).

The reasons for the use of antimony compounds as polycondensation catalyst may well be found in the low heat resistance of antimony-free films. The oven test (see test methods) was not passed by any of the commercially available films studied that had been produced exclusively with a titanium catalyst. Germanium-catalyzed films were even poorer than the titanium-catalyzed films.

Although experiments with use of phosphorus stabilizers, as described in JP 2007077220, to improve performance in the oven test by deactivating the catalyst led to reduced embrittlement, they did not lead to any reliable passing of the oven test. Nor was it possible to achieve reliable passing of the test by reducing, or entirely eliminating, use of regrind. Again, this achieved only some degree of improvement. This type of reduction moreover considerably impairs the cost-effectiveness of film production. Nor did any specific selection of the transesterification catalyst (elements studied being Zn, Mg, and Mn) lead to roasting film bags and sleeves which reliably pass the oven test.

EP-A-2 164 079 (whose United States equivalent is United States Patent Application Publication No. 2010/209722) describes an electrical insulation film made of a polyester which was produced at least to some extent by using titanium catalyst, where the film comprises a mixture of free-radical scavengers, in order to achieve greater thermal stability. However, the high content of free stabilizer, and a selection of the stabilizers that is possible within the context of the disclosure can lead to films which are unsuitable for the direct food-contact application (e.g. by exceeding limiting migration values). Necessary preconditions for a roasting film bag or sleeve are not only thermal stability and the suitability of all of the starting materials for direct contact with foods but also suitable transparency and color giving good visibility of the roasting contents for the user, and also minimized clouding and yellowing during roasting, in order to provide good-quality appearance, and also compliance with certain mechanical properties which permit reliable handling of the bag or sleeve prior to and after roasting.

SUMMARY OF ADVANTAGEOUS EMBODIMENTS OF THE INVENTION

It was therefore an object of the present invention to identify an antimony-free film which can be produced cost-effectively and which provides all of the properties necessary for production therefrom of a roasting film bag or sleeve which passes the oven test.

Said object is achieved via a biaxially oriented film which
1. comprises less than 10 ppm of antimony
2. has a haze of less than 10%
3. has an ultimate tensile strength of more than 100 N/mm² in every direction of the film
4. has a difference in the ultimate tensile strength in machine direction (MD) and transverse direction (TD) of less than 180 N/mm²
5. has a tensile strain at break of more than 50 in every direction of the film
6. has a tensile strain at break of more than 260% in no direction of the film
7. has a yellowness index b* of less than 2.5
8. has a lightness L*>85
9. comprises from 50 to 15000 ppm of a free-radical scavenger
10. has a film SV value of at least 600 after the oven test
11. has a tensile strain at break of >5% in every direction of the film after the oven test
12. has a film thickness of from 6 to 26 μm, and
13. is comprised of more than 90% by weight of polyester,
and film bags or film tubes incorporating the same.

DETAILED DESCRIPTION OF ADVANTAGEOUS EMBODIMENTS OF THE INVENTION

The film is comprised of at least 90% by weight, preferably at least 95% by weight, and ideally at least 97% by weight, of a thermoplastic polyester. The remaining % by weight here are free-radical scavengers, and additional materials such as particles to optimize windability, etc. In a preferred embodiment, there are no other polymers present. Suitable materials, inter alia, are polyesters made from ethylene glycol and terephthalic acid (=polyethylene terephthalate, PET), from ethylene glycol and naphthalene-2,6-dicarboxylic acid (=polyethylene 2,6-naphthalate, PEN), made of 1,4-bishydroxymethylcyclohexane and terephthalic acid (=poly(1,4-cyclohexanedimethylene terephthalate, PCDT), and polyesters made of isophthalic acid and ethylene glycol, and also of any desired mixtures of the diols and carboxylic acids mentioned.

Particular preference is given to polyesters which are comprised of at least 85 mol %, preferably at least 90 mol %, and in particular at least 95 mol %, of units derived from ethylene glycol and from terephthalic acid (hereinafter also termed "monomers" or "monomer units"). All monomers other than these two increase the price of the polymer and therefore lead to less cost-effectiveness, and are less preferred. The remaining monomers units derive from other aliphatic, cycloaliphatic, or aromatic diols and, respectively carboxylic acids. Examples of suitable other aliphatic diols are diethylene glycol, triethylene glycol, and aliphatic glycols of the general formula HO—$(CH_2)_n$—OH, where n is preferably smaller than 10.

The polyesters used are produced by using, as polycondensation catalyst, a suitable titanium compound or suitable aluminum compound. Antimony compounds are undesirable as polymerization catalyst, and the content of antimony is below 10 ppm and preferably below 2 ppm, and the polyester used to produce the film ideally comprises no antimony at all.

The film comprises from 50 to 15 000 ppm of a free-radical scavenger, and the content here is preferably from 100 to 5000 ppm, and in particular from 150 to 1000 ppm. Contents lower than 50 ppm lead to failure in the oven test and contents higher than 15000 ppm have no further improving effect on the film, and therefore only reduce cost-effectiveness, and can lead to migration of the stabilizer out of the film into the roasting contents.

Free-radical scavenger used can comprise either a compound or else a mixture of various compounds; preferably one compound. In the case of mixtures, it is necessary, where appropriate, to measure the migration values of all of the compounds in the film, and resultant costs are higher than for use of a single compound.

The free-radical scavenger(s) used are selected from the group of the phenolic antioxidants or from the group of the antioxidants which comprise at least the structural element

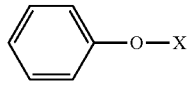

where X=H or an organic moiety, preferably H.

The following compounds have low toxicity and good properties as free-radical scavengers and are therefore preferred free-radical scavengers for the purposes of the invention:

5,7-di-tert-butyl-3-(3,4- and 2,3-dimethylphenyl)-3H-benzofuran-2-one, comprising
a) 5,7-di-tert-butyl-3-(3,4-dimethylphenyl)-3H-benzofuran-2-one (from 80 to 100% w/w) and
b) 5,3-di-tert-butyl-3-(2,3-dimethylphenyl)-3H-benzofuran-2-one (from 0 to 20% w/w), CAS No. 88-24-4=2,2'-methylenebis(4-ethyl-6-tert-butylphenol),
CAS No. 96-69-5 4,4'-thiobis(6-tert-butyl-3-methyl-phenol),
CAS No. 119-47-1=2,2'-methylenebis(4-methyl-6-tert-butylphenol),
CAS No. 128-37-0=2,6-di-tert-butyl-p-cresol,
CAS No. 991-84-4=2,4-bis(octylmercapto)-6-(4-hydroxy-3,5-di-tert-butylanilino)-1,3,5-triazine,
CAS No. 1709-70-2=1,3,5-trimethyl-2,4,6-tris(3,5-di-tert-butyl-4-hydroxybenzyl)benzene,
CAS No. 1843-03-4=1,1,3-tris(2-methyl-4-hydroxy-5-tert-butylphenyl)butane,
CAS No. 2082-79-6=octadecyl 3-(3,5-di-tert-butyl-4-hydroxyphenyl)propionate,
CAS No. 3135-18-0=3,5-di-tert-butyl-4-hydroxy-benzylphosphonic acid, dioctadecyl ester,
CAS No. 4130-42-1=2,6-di-tert-butyl-4-ethylphenol,
CAS No. 6683-19-8=pentaerythritol tetrakis[3-(3,5-di-tert-butyl-4-hydroxyphenyl)propionate],
CAS No. 23128-74-7=1,6-hexamethylenebis(3-(3,5-di-tert-butyl-4-hydroxyphenyl)propionamide),
CAS No. 25013-16-5=tert-butyl-4-hydroxyanisole,
CAS No. 27676-62-6=1,3,5-tris(3,5-di-tert-butyl-4-hydroxybenzyl)-1,3,5-triazine-2,4,6-(1H,3H,5H)-trione,
CAS No. 32509-66-3=ethylene glycol bis[3,3-bis(3-tert-butyl-4-hyroxyphenyl)butyrate],
CAS No. 32687-78-8=N,N'-bis(3-(3,5-di-tert-butyl-4-hydroxyphenyl)propionyl)hydrazide,
CAS No. 35074-77-2=1,6-hexamethylene bis(3-(3,5-di-tert-butyl-4-hydroxyphenyl)propionate),
CAS No. 35958-30-6=1,1-bis(2-hydroxy-3,5-di-tert-butylphenyl)ethane,
CAS No. 36443-68-2=triethylene glycol bis[3-(3-tert-butyl-4-hydroxy-5-methylphenyl)propionate],
CAS No. 40601-76-1=thiodiethanol bis(3-(3,5-di-tert-butyl-4-hydroxyphenyl)propionate),
CAS No. 57569-40-1=terephthalic acid, diester with 2,2'-methylenebis(4-methyl-6-tert-butylphenol),
CAS No. 61167-58-6=acrylic acid, 2-tert-butyl-6-(3-tert-butyl-2-hydroxy-5-methylbenzyl)-4-methylphenyl ester,
CAS No. 65140-91-2=3,5-di-tert-butyl-4-hydroxybenzylphosphonic acid monoethyl ester, calcium salt,
CAS No. 70331-94-1=2,2'-oxamidobis[ethyl 3-(3,5-di-tert-butyl-4-hydroxyphenyl)propionate],
CAS No. 110553-27-0=2,4-bis(octylthiomethyl)-6-methylphenol,
CAS No. 110675-26-8=2,4-bis(dodecylthiomethyl)-6-methyl-phenol.

Free-radical scavengers with the structural element of the invention should have a molecular weight above 300 and particularly preferably above 500, since compounds with low molecular weights have excessive volatility under the processing temperatures typical for polyesters and are therefore lost to some extent by evaporation during the film-production process. This can lead to production problems (fuming, odor, blistering in the film, etc.), and moreover has the disadvantage of relatively high tendency toward migration during the use as roasting bag or roasting sleeve. This applies inter alia to the compounds mentioned in the above list with the CAS Nos: 2082-79-6, 25013-16-5, 128-37-0. Compounds with a molecular weight below 300 are therefore preferably used to an extent of less than 500 ppm and particularly preferably to an extent of less than 300 ppm, and ideally not used at all. Compounds with a molecular weight below 500 are preferably used to an extent of less than 1000 ppm, and particularly preferably to an extent of less of 500 ppm, and ideally not used at all.

When compounds from the above list which comprise nitrogen were used, they led to films with higher yellowness indices. This is undesirable, and free-radical scavengers having nitrogen in the molecular formula are preferably used to an extent of less than 1000 ppm, particularly preferably to an extent of less than 500 ppm, and ideally are not used at all.

Free-radical scavengers having sulfur in the molecular formula exhibit, during the production of the film, an odor which is characteristic and perceived as rather unpleasant, and are therefore less preferred. Free-radicals scavengers having sulfur in the molecular formula are therefore preferably used to an extent of less than 500 ppm, particularly preferably to an extent of less than 300 ppm, and ideally are not used at all.

Particularly good properties in respect of thermal stability, of low migration out of the film, and yellowing were exhibited by the compounds with CAS Nos. 1709-70-2, 3135-18-0, 6683-19-8 and 57569-40-1. These are preferred free-radical scavengers for the purposes of the invention. Particular preference is given here to the compounds with CAS Nos. 1709-70-2 and 6683-19-8, for the reasons mentioned.

The free-radical scavenger(s) can be added to the polyester either directly during production of the polymer or else subsequently via incorporation of the compounds into a finished polyester. In the case of incorporation into a finished polyester, CAS No. 1709-70-2 (IRGANOX® 1330) has proven to be particularly suitable, since no blistering or fuming was observed here.

The thickness of the film used in the invention is from 6 to 26 μm. At less than 6 μm, risk-free handling of the film by the final user becomes impossible, and in particular tearing of the film during use can more easily occur. These films moreover have a disadvantageous ratio of surface area to amount of polymer, and this reduces the time to embrittlement in the oven test. Thinner films therefore have to comprise markedly more free-radical scavenger than thicker film, and the amount of migration of the free-radical scavenger out of the film can then be greater and undesirable. Films with a thickness above 26 μm exhibit no further advantage in respect of stability, giving only a reduction in the cost-effectiveness of the roasting bags or sleeves produced therefrom. Film thickness is therefore ideally from 8 to 15 μm.

The film can have one or more layers, and preference is given here to multilayer embodiments, since by this means it is possible more easily to achieve the low haze and lightness of the invention. (If antiblocking additives are added, these are preferably added to the outer layers). In multilayer embodiments, the free-radical scavenger(s) of the invention must be present in all of the layers, and values below the lower limit of the invention, 50 ppm, are not permitted in any layer, since otherwise the oven test is not passed.

All of the layers can also mutually independently comprise conventional additives, such as antiblocking agents. It is preferable to use these additives in the outer layers (layers A and C). They are usually added to the polymer or polymer mixture prior to melting. In order to achieve the values of the invention for lightness and haze, it has proven advantageous for the film to comprise less than 1.5% by weight, and preferably less than 0.9% by weight, and ideally less than 0.5% by weight, of antiblocking agents and other particles or pigments.

Typical antiblocking agents are inorganic and/or organic particles, for example crystalline or amorphous silica, talc, magnesium carbonate, barium carbonate, calcium sulfate, lithium phosphate, calcium phosphate, magnesium phosphate, aluminum oxide, aluminum silicates, lithium fluoride, the calcium, barium, zinc, or manganese salts of the dicarboxylic acids used, titanium dioxide, kaolin, or crosslinked polystyrene particles or crosslinked PMMA particles.

Antiblocking agents that are selected can also comprise mixtures of two or more different antiblocking agents or mixtures of antiblocking agents of identical composition but of different particle size. The antiblocking agents and the pigments can be added to the individual layers in the respective advantageous concentrations, e.g. in the form of glycol dispersion, during the polycondensation process, or by way of masterbatches during the extrusion process.

The haze of the film is less than 10%. It is preferable that the haze is smaller than 5%, and ideally smaller than 3%. The haze of the film of the invention after the oven test is particularly advantageously less than 15%, preferably less than 8%, and particularly preferably less than 5%. The increase in haze here during the oven test is preferably less than 5% (absolute), particularly preferably less than 3%, and very particularly preferably less than 2%. Either high haze prior to the oven test or else a marked increase in haze during baking would be evaluated as disadvantageous by the user, since the former implies a poorer view of the roasting contents through the material, and the latter indicates that the film has altered during roasting, and this provides a reason to suspect contamination of the roasting contents. A low rise in haze can be achieved via the inventive selection of the stabilizers in the amounts of the invention, particularly if the stabilizer has little tendency to be lost by evaporation (high molecular weight).

The lightness of the film L* is greater than 85, preferably greater than 90, and ideally greater than 93.5. The yellowness index b* of the film is smaller than 2.5, preferably smaller than 2, and ideally smaller than 1.5.

In a preferred embodiment, the transparency of the films is greater than 80%, preferably greater than 88%, and ideally greater than 90%.

These optical properties lead to a film with attractive appearance, and provide a good, unhindered view of the roasting contents. In order to achieve said properties, it has proven advantageous to comply with the abovementioned quantitative data for antiblocking agents and free-radical scavengers.

The tensile strain at break of the film is moreover at least 50% in both film directions. It is preferable that the tensile strain at break in both film directions is at least 60%, and it is ideally at least 75%. Ultimate tensile strength in both film directions is more than 100 N/mm². It is preferable that ultimate tensile strength in both film directions is more than 150 N/mm², and is ideally more than 180 N/mm². The difference in the ultimate tensile strength between machine direction (MD) and transverse direction (TD) is smaller than 180 N/mm², preferably smaller than 120 N/mm², and ideally smaller than 100 N/mm².

Tensile strain at break is moreover not more than 260% in any film direction, and is preferably not above 210% in any film direction. These mechanical properties lead to good processing performance of the film, and lead to good handling of the bag or sleeve after roasting. This means that a tear/cut can be made therein, but the tear/cut does not undergo uncontrolled propagation in any film direction, Said properties are achieved via compliance with the thickness ranges of the invention, the production process (see below), and the polyester described above, and it has proven to be advantageous to comply with the abovementioned quantitative data for antiblocking agents and free-radical scavengers.

The tensile strain at break of the film in every film direction after the oven test is moreover more than 5%, preferably more than 10%, and ideally more than 20%. The SV value of the film after the oven test is moreover at least 600, preferably at least 650, and ideally at least 750. It therefore remains possible to handle the bag or sleeve without breakage after roasting.

It has moreover proven advantageous for the yellowness index b* of the film after the oven test to be less than 4, preferably less than 3.5, and ideally less than 3, since more severe yellowing is evaluated by the end user as a sign of inadequate quality. This is achieved if an adequate amount of free-radical scavengers of the invention is added, and in particular if the particularly preferred stabilizers are used.

The longitudinal and transverse shrinkage of the film used in the invention is usually below 5% at 150° C., preferably below 2.5%, and particularly preferably below 2%. This avoids any undesired reduction in the size of the bag or sleeve during roasting. The shrinkage properties are achieved by the process described below.

In another preferred embodiment, the film has been coated at least on one side with an adhesion promoter for printing inks. Examples of suitable coatings are acrylates or copolyesters having sulfoisophthalic acid contents of >0.2% by weight.

In one preferred embodiment, the film has an Ra value of at least 30 nm on each surface, preferably at least 40 nm, and ideally at least 45 nm. The Ra value is preferably not more than 150 nm on any surface, more preferably not more than 110 nm on any surface, and ideally below 100 nm. Excessively low Ra values can lead to static coherence of the bag or tube, making it more difficult for the end user to open same. Excessively high RA values can lead to undesired haze of the film.

Process

The polyester matrix polymers of the individual layers are produced by polycondensation, either starting from dicarboxylic acids and diol ("PTA process") or else starting from the esters of the dicarboxylic acids, preferably the dimethyl esters, and diol ("DMT process") SV values of polyethylene terephthalates that can be used are preferably in the range from 700 to 1000.

First, the polymer or the polymer mixture of the individual layers is compressed and plastified in an extruder. The melts are then forced through a flat-film die, and drawn off on a chill roll and on one or more take-off rolls, whereupon they cool and solidify.

The film of the invention is biaxially oriented, i.e. biaxially stretched. The biaxial orientation of the film is most frequently carried out sequentially. It is preferable here to orientate first longitudinally (i.e. in machine direction=MD) and then transversely (i.e. perpendicularly to machine direction=TD, transverse direction). The longitudinal orientation can be achieved with the aid of two rolls running at different speeds corresponding to the desired stretching ratio. The transverse orientation is generally achieved by utilizing an appropriate tenter frame.

Instead of the sequential stretching process, it is also possible, but not necessary, to stretch the film simultaneously.

The temperature at which the stretching process is carried out can vary relatively widely. The longitudinal stretching is generally carried out within a temperature range of from 80 to 130° C. (heating temperatures from 80 to 130° C.), and the transverse stretching process is generally carried out within a temperature range from 90° C. (start of stretching) to 140° C. (end of stretching). The longitudinal stretching ratio is generally from 2.5:1 to 5.5:1, preferably from 3:1 to 4.5:1, in particular from 3.2 to 4. The transverse stretching ratio is generally in the range from 2.8:1 to 5.5:1, preferably from 3:1 to 4.7:1 and in particular from 3.2 to 4.5.

Prior to the transverse stretching process, one or both surfaces of the film can be in-line coated by the processes known per se. The in-line coating can by way of example lead to an improvement in the antistatic performance, or in the processing performance, of the film. If the exterior coextruded layers comprise no inorganic particles for improving the slip properties and winding properties, it is possible at this point to apply a coating comprising particles.

In the heat-setting process that follows, the film is kept at a temperature of from 150 to 250° C., under tension, for a period of about 0.1 to 10 s, and, in order to achieve the preferred shrinkage/length change values, relaxed transversely by at least 1%, preferably at least 3%, and particularly preferably at least 4%. Said relaxation preferably takes place within a temperature range from 150 to 190° C. It is preferable that from <25% to >5% of the total relaxation takes place within the first 25% of the relaxation time. The film is then wound up conventionally.

It has been ensured that, during production of the film, regrind can be returned to the extrusion process at a concentration of from 0 to 80%, based on the total weight of the film, without any resultant significant adverse effect on the physical and optical properties of the film. This means that there is no yellowing and no failure in the oven test.

A film bag or tube of any desired size is then produced from the film of the invention, by adhesive bonding or preferably by welding.

The use of the film of the invention leads to a roasting bag or sleeve which comprises no, or extremely little, antimony, does not embrittle in the oven, and has not only good optical properties but also good handling properties.

The values measured in order to characterize the raw materials and the films were as follows:

Roughness

The roughness $R_a$ of the film is determined in accordance with DIN 4768.

Transparency

Transparency is determined in accordance with ASTM D1003-61 method A, by means of a HAZE-GARD® PLUS from BYK-Gardner GmbH, Germany.

Mechanical Properties

Modulus of elasticity, ultimate tensile strength, tensile strain at break, and $F_5$ value are measured longitudinally and transversely in accordance with ISO 527-1 and 527-3 with the aid of tensile strain measurement equipment (type 010 from Zwick/DE).

Standard Viscosity (SV)

Standard viscosity SV is measured—by a method based on DIN 53726—by measuring the relative viscosity $\eta_{rel.}$ of a 1% by weight solution of polymer in dichloroacetic acid (DCA) at 25° C. in an Ubbelohde viscosimeter. The dimensionless SV value is determined as follows from the relative viscosity $\eta_{rel.}$:

$$SV=(\eta_{rel.}-1)\cdot 1000$$

Shrinkage

Thermal shrinkage is determined on square film samples with 10 cm edge length. The specimens are cut out in such a way that one edge runs parallel to the machine direction and one edge runs perpendicularly to the machine direction. The specimens are measured precisely (edge length $L_0$ being determined for each direction TD and MD, giving $L_{0\ TD}$ and $L_{0\ MD}$), and are heat-conditioned at the stated shrinkage temperature (here 150° C.) for 15 min in a convection drying oven. The specimens are removed and measured precisely at room temperature (edge length $L_{TD}$ and $L_{MD}$). The following equation gives the shrinkage:

$$\text{Shrinkage [\%] MD} = 100 \cdot (L_{0\,MD} - L_{MD})/L_{0\,MD}$$

$$\text{Shrinkage [\%] TD} = 100 \cdot (L_{0\,TD} - L_{TD})/L_{0\,TD}$$

Haze

Determined in accordance with ASTM D1003-61 (method A) by means of a HAZE-GARD® PLUS from BYK-Gardner GmbH, Germany.

Color Coordinates (CIE), Lightness, a*, b*, L*

These values are determined in a spectral photometer from BYK, Germany.

Equipment: color-sphere

The name of the measurement program is: auto-QC.

Oven Test

A piece of film is placed in a convection oven which had been preheated to 220° C. The film here is placed on a wire gauze. The film remains for 90 minutes in the oven at 220° C. Mechanical properties, yellowness index, and SV value are then determined as described.

EXAMPLES

The raw materials used in the examples are as follows:

PET1=polyethylene terephthalate made of ethylene glycol and terephthalic acid with SV 820 and DEG content 0.9% by weight (diethylene glycol content as monomer). Produced by means of PTA process. Catalyst antimony trioxide. Antimony content 250 ppm. Transesterification catalyst zinc acetate.

PET2=polyethylene terephthalate made of ethylene glycol and terephthalic acid with SV 825 and DEG content 0.9% by weight (diethylene glycol content as monomer). Produced by means of PTA process. Catalyst potassium titanyl oxalate having 18 ppm of titanium. Antimony content 0 ppm. Transesterification catalyst zinc acetate.

PET3=polyethylene terephthalate made of ethylene glycol and dimethyl terephthalate with SV 800 and DEG content 1% by weight (diethylene glycol content as monomer) and 1.0% by weight of the silicon dioxide pigment SYLOBLOC® 44H with $d_{50}$ of 2.5 μm. Produced by means of DMT process. Catalyst potassium titanyl oxalate having 18 ppm of titanium. Antimony content 0 ppm. Transesterification catalyst zinc acetate.

PET4=5000 ppm of IRGANOX® 1330 CAS No. 1709-70-2 (producer: BASF, Switzerland) incorporated by means of a twin-screw extruder into PET2. SV value 700. Antimony content 0 ppm.

PET5=5000 ppm of IRGANOX® 1098 CAS No. 23128-74-7 (producer: BASF, Switzerland) incorporated by means of a twin-screw extruder into PET2. SV value 695. Antimony content 0 ppm.

PET6=polyethylene terephthalate made of ethylene glycol and dimethyl terephthalate with SV 820 and DEG content 0.9% by weight (diethylene glycol content as monomer) and 1.0% by weight of the silicon dioxide pigment SYLOBLOC® 44H with $d_{50}$ of 2.5 μm. Produced by means of DMT process. Catalyst antimony trioxide. Antimony content 250 ppm. Transesterification catalyst zinc acetate.

Process for Examples

The polymer mixtures are melted at 290° C. in 3 twin-screw extruders:

The polymer mixtures are combined in an adapter and, via a flat-film die, applied electrostatically to a chill roll controlled to a temperature of 30° C. The film is then stretched longitudinally and then transversely under the following conditions:

| Longitudinal stretching | Heating temperature | 75-115° C. |
|---|---|---|
| | Stretching temperature | 115° C. |
| | Longitudinal stretching ratio | 3.5 |
| Transverse stretching | Heating temperature | 100° C. |
| | Stretching temperature | 110° C. |
| | Transverse stretching ratio | 4.0 |
| Setting | Temperature | 237-150° C. |
| | Duration | 2 s |
| | Relaxation in TD at 200-150° C. | 8% |

The total thickness of the resultant film is 12 μm, and the thickness of both of the outer layers A and C is 1.2 μm.

| Raw materials | Inventive example 1 | Inventive example 2 | Comparative example 1 | Comparative example 2 |
|---|---|---|---|---|
| Layer A | 10% by wt. of PET3/ 80% by wt. of PET2/ 10% by wt. of PET4 | 10% by wt. of PET3/ 80% by wt. of PET2/ 10% by wt. of PET5 | 10% by wt. of PET6/ 90% by wt. of PET1 | 10% by wt. of PET3/ 90% by wt. of PET2 |
| Layer B | 90% by wt. of PET2/ 10% by wt. of PET4 | 90% by wt. of PET2/ 10% by wt. of PET5 | 100% by wt. of PET 1 | 100% by wt. of PET2 |
| Layer C | 10% by wt. of PET3/ 80% by wt. of PET2/ 10% by wt. of PET4 | 10% by wt. of PET3/ 80% by wt. of PET2/ 10% by wt. of PET5 | 10% by wt. of PET6/ 90% by wt. of PET1 | 10% by wt. of PET3/ 90% by wt. of PET2 |
| Antimony content in ppm | 0 | 0 | 250 | 0 |
| SV of films | 790 | 781 | 787 | 788 |
| b* | 0.6 | 2.3 | 0.2 | 0.9 |
| b* after oven test | 0.65 | 3.4 | 0.3 | 2.1 |
| SV after oven test | 805 | 710 | 770 | 287 |
| Tensile strain at break, MD in % | 101 | 98 | 102 | 100 |
| Tensile strain at break, TD in % | 95 | 93 | 94 | 94 |
| Tensile strain at break, MD in % after oven test | 75 | 53 | 79 | 3 |
| Tensile strain at break, TD in % after oven | 65 | 42 | 61 | 2 |
| Ultimate tensile strength, MD in N/mm$^2$ | 220 | 201 | 225 | 235 |
| Ultimate tensile strength, TD in N/mm$^2$ | 263 | 214 | 267 | 258 |

-continued

| Raw materials | Inventive example 1 | Inventive example 2 | Comparative example 1 | Comparative example 2 |
|---|---|---|---|---|
| Haze in % | 1.9 | 2 | 1.8 | 1.9 |
| Haze in % after oven test | 2.9 | 6.3 | 6.7 | 21.3 |
| Transparency in % | 91.5 | 89.8 | 91.3 | 91.1 |
| Shrinkage, MD in % | 1.6 | 1.6 | 1.6 | 1.6 |
| Shrinkage, TD in % | 0.2 | 0.2 | 0.2 | 0.2 |
| Lightness L* | 95.9 | 93.4 | 95.9 | 95.3 |

In all of the inventive examples and comparative examples, roughness $R_a$ was from 54 to 63 nm That which is claimed:

1. Film bags or film tubes comprising a biaxially oriented film which
a) comprises less than 10 ppm of antimony;
b) has a haze of less than 10%;
c) has an ultimate tensile strength of more than 100 N/mm$^2$ in every direction of the film;
d) has a difference in the ultimate tensile strength in machine direction (MD) and transverse direction (TD) of less than 180 N/mm$^2$;
e) has a tensile strain at break of more than 50% in every direction of the film;
f) has a tensile strain at break of more than 260% in no direction of the film;
g) has a yellowness index b* of less than 2.5;
h) has a lightness L*>85;
i) comprises from 50 to 15000 ppm of a free-radical scavenger;
j) has a film SV value of at least 600 after the oven test;
k) has a tensile strain at break of >5% in every direction of the film after the oven test;
l) has a film thickness of from 6 to 26 μm; and
m) is comprised of more than 90% by weight of a polyester.

2. Film bags or film tubes as claimed in claim 1, wherein the film comprises one or more free-radical scavengers selected from the group consisting of the compounds with the CAS number 1709-70-2, 3135-18-0, 6683-19-8 and 57569-40-1.

3. A biaxially oriented polyester film which
a) comprises less than 2 ppm of antimony;
b) has a haze of less than 5%;
c) has an ultimate tensile strength of more than 100 N/mm$^2$ in every direction of the film;
d) has a difference in the ultimate tensile strength in machine direction (MD) and transverse direction (TD) of less than 180 N/mm$^2$;
e) has a tensile strain at break of more than 50% in every direction of the film;
f) has a tensile strain at break of more than 260% in no direction of the film;
g) has a yellowness index b* of less than 2.5;
h) has a lightness L*>90;
i) comprises from 50 to 15000 ppm of a free-radical scavenger selected from the group consisting of the compounds with the CAS number 1709-70-2, 3135-18-0, 6683-19-8 and 57569-40-1;
j) has a shrinkage in MD and TD of less than 2.5% at 150° C.;
k) has a roughness Ra of more than 40 nm and less than 110 nm;
l) has a film thickness of from 6 to 26 μm;
m) has a film SV of at least 600 after the oven test;
n) has a tensile strain at break of >5% in every direction of the film after the oven test; and
o) has a yellowness index b* of less than 4 after the oven test.

* * * * *